United States Patent [19]

Schatteman et al.

[11] Patent Number: 4,664,454

[45] Date of Patent: May 12, 1987

[54] STORAGE DEVICE FOR RECORD DISCS

[75] Inventors: Etienne A. M. Schatteman, Wemmel; Philippe V. Denis, Genappe, both of Belgium

[73] Assignee: Staar S.A., Brussels, Belgium

[21] Appl. No.: 662,271

[22] Filed: Oct. 18, 1984

[30] Foreign Application Priority Data

Dec. 22, 1983 [BE] Belgium .................................. 212095
Jun. 26, 1984 [BE] Belgium .................................. 213216

[51] Int. Cl.⁴ .............................................. A47B 81/06
[52] U.S. Cl. ........................................ 312/13; 206/309; 211/40; 312/14; 312/15
[58] Field of Search .................... 312/8, 9, 10, 11, 12, 312/13, 14, 15, 16, 17, 18, 19; 211/40; 206/309

[56] References Cited

U.S. PATENT DOCUMENTS

| | | | |
|---|---|---|---|
| 881,950 | 3/1908 | Progler | 206/309 X |
| 1,014,172 | 1/1912 | Pooley | 312/12 |
| 1,291,924 | 1/1919 | King | 312/18 |
| 1,315,989 | 9/1919 | Rubin | 312/8 |
| 1,429,076 | 9/1922 | Helsley | 312/12 |
| 1,436,026 | 11/1922 | Ferge et al. | 312/11 |
| 1,481,066 | 1/1924 | Pierson | 312/10 |
| 1,701,479 | 2/1929 | Fairbanks | 312/13 |
| 2,453,399 | 11/1948 | Baker et al. | 312/15 |
| 2,475,495 | 7/1949 | Haag | 312/15 |
| 3,084,983 | 4/1963 | Stuart | 312/13 |
| 3,866,990 | 2/1975 | McRae | 312/15 |

FOREIGN PATENT DOCUMENTS

| | | | |
|---|---|---|---|
| 172037 | 7/1952 | Austria | 312/18 |
| 898775 | 5/1984 | Belgium . | |
| 670789 | 12/1929 | France | 312/15 |
| 39582 | 9/1931 | France | 312/14 |
| 153187 | 11/1920 | United Kingdom | 312/13 |
| 249697 | 4/1926 | United Kingdom . | |
| 253309 | 6/1926 | United Kingdom . | |
| 312787 | 6/1929 | United Kingdom . | |
| 324482 | 1/1930 | United Kingdom . | |
| 466769 | 6/1937 | United Kingdom . | |
| 476462 | 12/1937 | United Kingdom . | |
| 589187 | 6/1947 | United Kingdom | 312/15 |
| 708760 | 5/1954 | United Kingdom . | |
| 987720 | 3/1965 | United Kingdom . | |
| 1075738 | 7/1967 | United Kingdom | 312/13 |
| 1150689 | 4/1969 | United Kingdom | 312/10 |

Primary Examiner—Kenneth J. Dorner
Assistant Examiner—Thomas A. Rendos
Attorney, Agent, or Firm—Leydig, Voit & Mayer

[57] ABSTRACT

A storage device for record discs having a housing defining a compartment for holding a record disc in a fixed position and having an entrance through which the disc is inserted edgewise in its own plane to the fixed position; a first V-grooved member fixed in the compartment generally adjacent and behind the transverse center line is adapted to engage the lateral edge of the disc when in the fixed position; a second V-grooved member fixed in the compartment generally adjacent and disposed on the opposite side of the longitudinal center line from the first member in a back portion of the compartment is adapted to engage the back edge of the disc when in the fixed position; a securing lever pivotally mounted in the compartment generally adjacent and forward of the transverse center line and urged in one direction by a spring has a third V-grooved member adapted to engage another lateral edge and hold the record disc resiliently against the first and second members in the fixed position; and a fourth V-grooved member adapted to engage the record disc when it is inserted in the compartment entrance and guide the disc to the fixed position, the lever being movable to locate the fourth V-grooved member to receive the disc.

3 Claims, 9 Drawing Figures

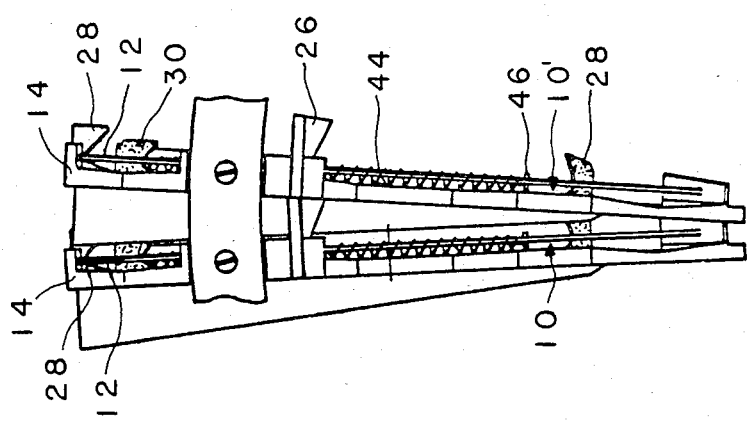
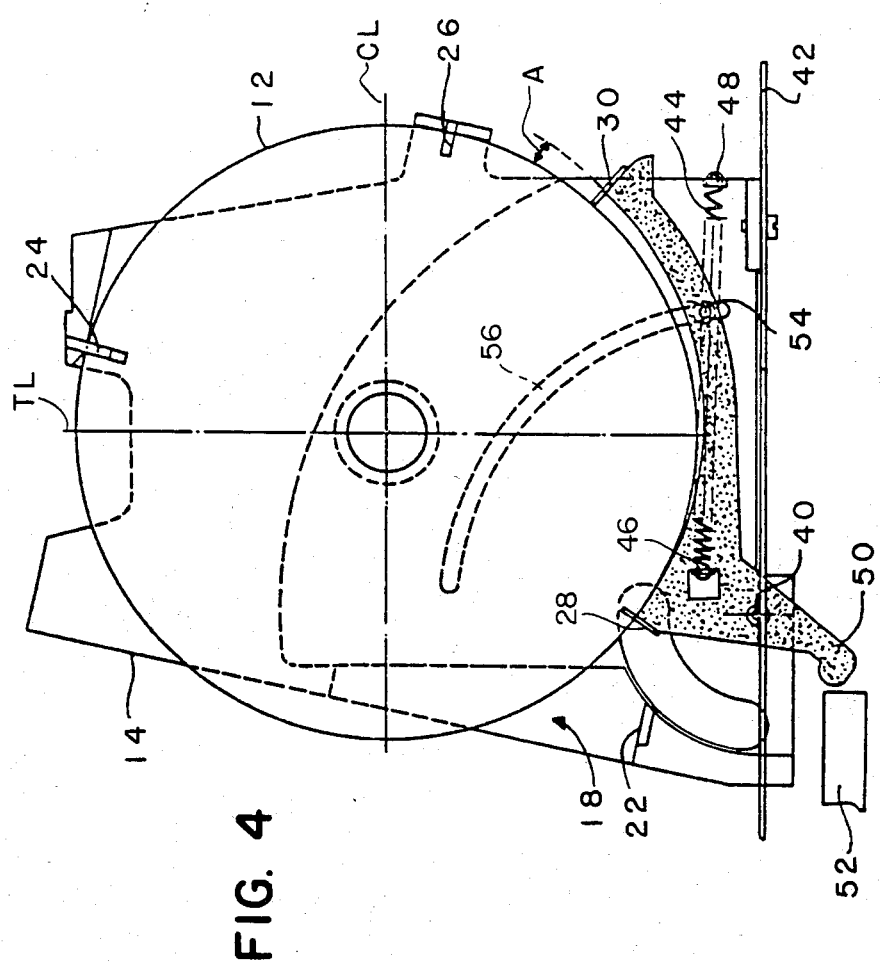

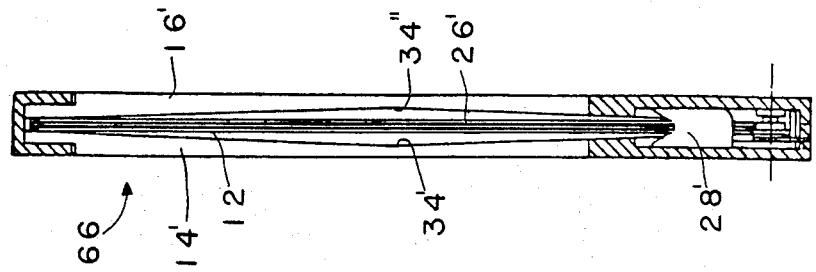
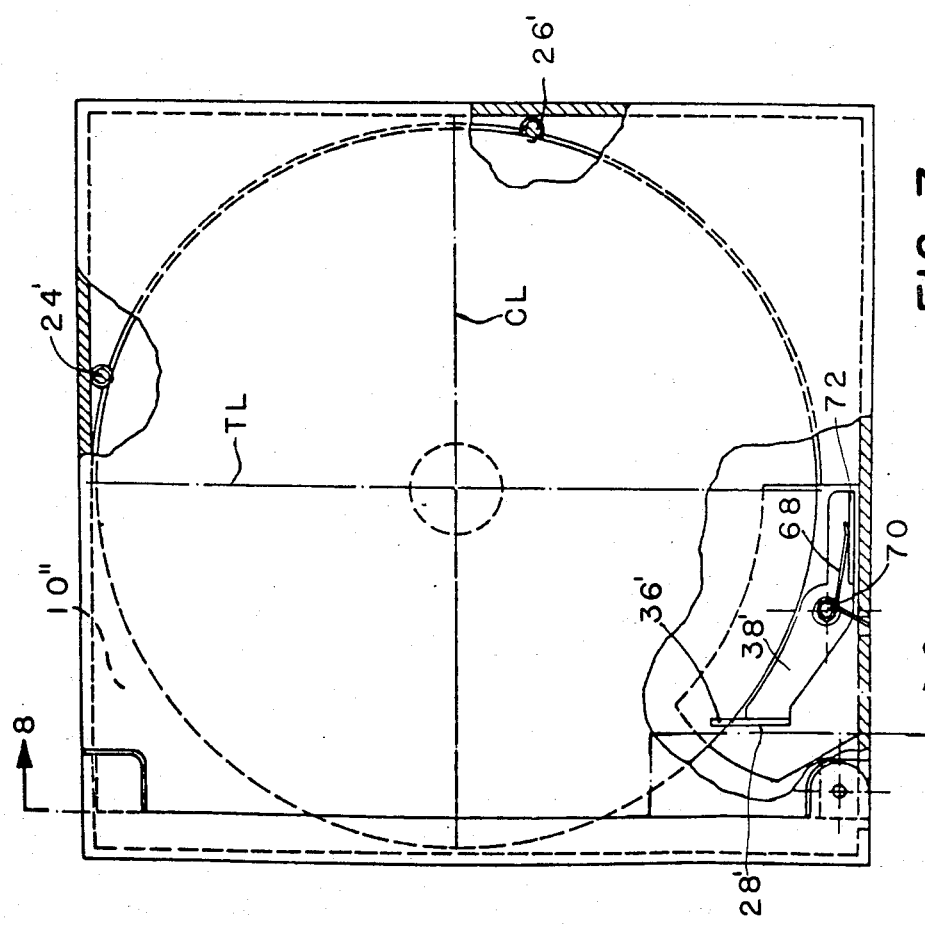
FIG. 8
FIG. 7

4,664,454

STORAGE DEVICE FOR RECORD DISCS

TECHNICAL FIELD

This invention relates to storage devices for record discs and, more particularly, to mechanisms for holding and securing record discs in storage devices.

BACKGROUND ART

In satisfactorily storing record discs in racks and compartments, one of the major problems is to avoid contact with the surfaces of the record discs by any handling mechanism, as well as by the walls of the storage devices themselves. Conventional grooved record discs, as well as compact record discs known as CD discs, are subject to scratching and marking of the information bearing surfaces which impairs the reproduction or recording on the record discs. It is always recommended that record discs should be handled only by their edges and should not be contacted on their surfaces.

A record storage device has been proposed as a solution to this problem wherein the record is kept away from the space-defining walls by a member which cooperates with a central hole in the record. Unfortunately, this solution calls for delicate and complicated handling of the record and is of use only for a single space and not for a group of juxtaposed spaces.

Also, there is always the possibility that the record, since it is retained only by way of its central hole, may at any time contact one of the walls of the storage device.

DISCLOSURE OF INVENTION

It is the principal object of the invention to provide a storage device providing a storage compartment for holding a record disc in a fixed position solely by the edge of the record disc and preventing contact between the surfaces of the record disc and the walls of the storage compartment.

Another object is to provide a storage device mechanism which is simple in construction, reliable in operation and capable of being mass produced at low cost.

BRIEF DESCRIPTION OF THE DRAWINGS

Further objects and advantages will be clear from the following description of preferred embodiments, taken in conjunction with the accompanying drawings, in which:

FIG. 4 is a view similar to FIGS. 1 and 3 with the securing lever and the record disc in the fixed position of the record disc in the compartment;

FIG. 6 is a top view of two juxtaposed storage compartments which are arcuately arranged;

FIG. 7 is a side view of another embodiment of the invention in the form of a record disc storage container having a single compartment 10 and a pivotally mounted securing lever;

FIG. 8 is a sectional view taken in the plane of lines 8—8 in FIG. 7; and

BEST MODE FOR CARRYING OUT THE INVENTION

Figure 1:
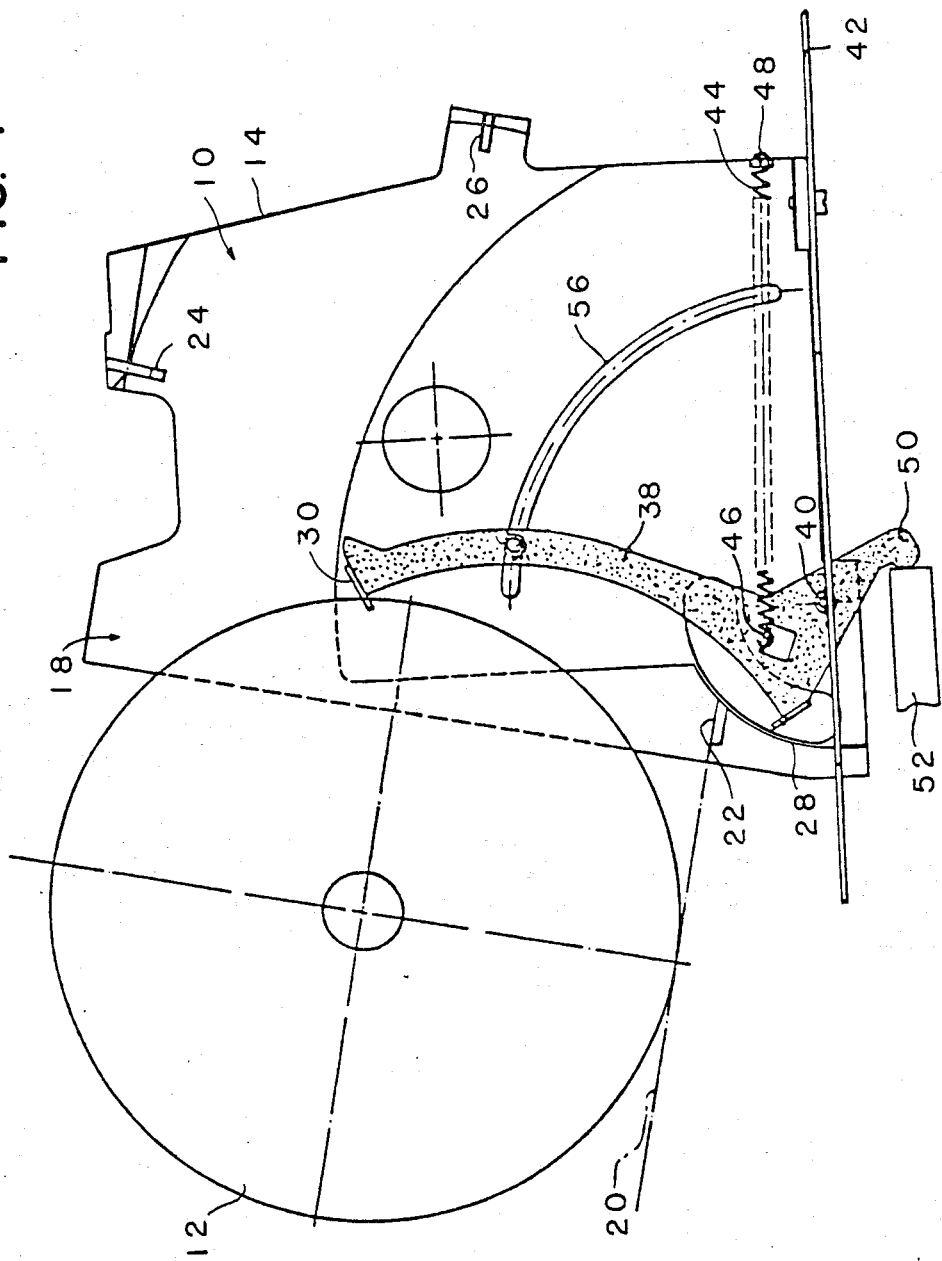
FIG. 1 is a side view with parts in section of a portion of a storage rack or magazine illustrating a compartment with one wall removed, as indicated by the lines 3—3 in FIG. 2, and shows a pivotally mounted securing lever in the record disc introducing or record disc releasing phase.
Figure 2:
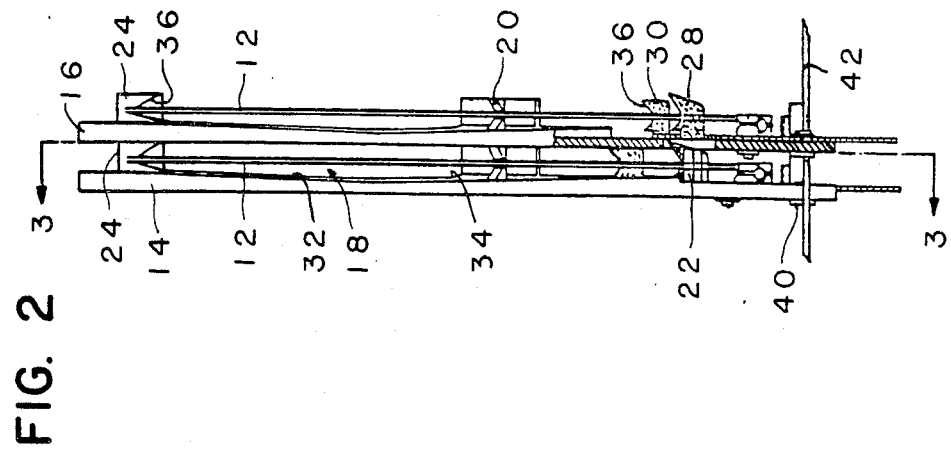
FIG. 2 is a fragmentary front view with parts in section of a storage device having a number of record disc compartments.

FIGS. 1-4 illustrate the construction of a compartment 10 of a multi-compartmented storage device for record discs 12 which is particularly, although not exclusively, useful for the storage of CD discs in a record disc rack or record disc magazine. Only a portion of a rack or magazine is shown to illustrate the construction of a single compartment 10 which is defined by spaced walls 14, 16 leaving an entrance 18 through which a record disc is inserted, as shown in FIG. 1, to a fixed position, shown in FIG. 4, in the compartment 10. The compartments 10 are juxtaposed in a rack or magazine, as indicated in FIG. 2, for storage of a plurality of discs 12, which may be used as a component of a record disc player or recorder, in which case the record disc 12 may be inserted into or withdrawn from the compartments 10 by rolling along its bottom edge on a ramp suface 20 leading to a ledge 22 which bridges the walls 14, 16 of the compartment 10.

In accordance with this invention, means are mounted within the compartment 10 adapted to engage a record disc 12 solely at its edge as it is inserted to guide the disc 12 to the fixed position in the compartment 10 and to secure the record disc 12 and hold it immobile in this position. As herein shown, the engaging means is provided by a plurality of V-grooved members 24, 26, 28, 30 adapted to engage the edge of the record disc 12. In this way, contact is avoided with the surfaces of the record disc 12 to prevent scratching or marring these surfaces which contain recorded information. Further in keeping with the objective to avoid any contact between the mechanism and the surfaces of the record disc 12, the edges 32 of the entrance 18 to the compartment 10 and inside surfaces 34 of the walls 14, 16 themselves may be concave so that they are more widely separated adjacent the center of the record disc 12 than at the regions adjacent the edges of the disc.

To carry out the invention, the V-grooved record disc 12 engaging and securing members 24, 26, 28, 30 are shown in FIGS. 1-5 as lugs, each having a V-shaped notch 36. Referring to FIG. 4, which shows a record disc 12 held immobile in fixed position in the compartment 10, the compartment 10 can be considered to have a longitudinal center line CL and a transverse center line TL intersecting at the center of the record disc 12 when held in fixed position. A first one of the V-grooved members 24, which is fixed, is located to tangentially engage a lateral edge of the record disc 12 and is generally adjacent and behind the transverse center line TL, as shown in FIGS. 2 and 4, engaging the top edge of the record disc 12. A second one of the V-grooved members 26, which is also fixed, is located in the back portion of the compartment 10 generally adjacent and below the longitudinal center line CL on the side of the longitudinal center line CL remote from the first V-grooved member 24. These first and second V-grooved members 24, 26 are separated and tangentially engage the edge of the record disc 12 at portions peripherally spaced about 90 degrees apart. A third one of the V-grooved members 28, which is movably mounted, is located near the entrance 18 generally adjacent and forward of the transverse center line TL and is adapted to tangentially engage a lateral edge of the record disc 12. The third V-grooved member 28 is mounted to hold the record disc 12 resiliently but firmly against the first and second fixed V-grooved members 24, 26, for this purpose being mounted on a pivotally mounted securing lever 38. The location of the third V-grooved member 28 is such as to tangentially engage an edge portion of the record disc 12 spaced peripherally greater than 90 degrees from the second V-grooved member 26 so that it acts as a latch or securing means to hold the disc.

As indicated, the third V-grooved member 28 holds the record disc 12 resiliently and, for this purpose, the third V-grooved member 28 is movably supported by a securing lever 38 pivotally mounted on a shaft 40 carried by the chassis or housing 42 and acted on by a spring 44 which is secured at one end 46 to the securing lever and at the other end 48 to the chassis 42 so as to be under tension, urging the lever 38 clockwise, as viewed in FIG. 4, about the pivotal axis of the shaft 40.

Referring to FIG. 1, which shows a record disc 12 being inserted into or being released from the compartment 10, in carrying out the invention a fourth V-grooved member 30 is carried by the securing lever 38 which is pivotable to a raised position, shown in FIG. 1, and located in that position so that the fourth V-grooved member 30 is adjacent the entrance 18 and in position to be engaged by a record disc 12 as it enters the compartment 10 through the entrance 18, entering edge-first in its own plane.

Figure 3:
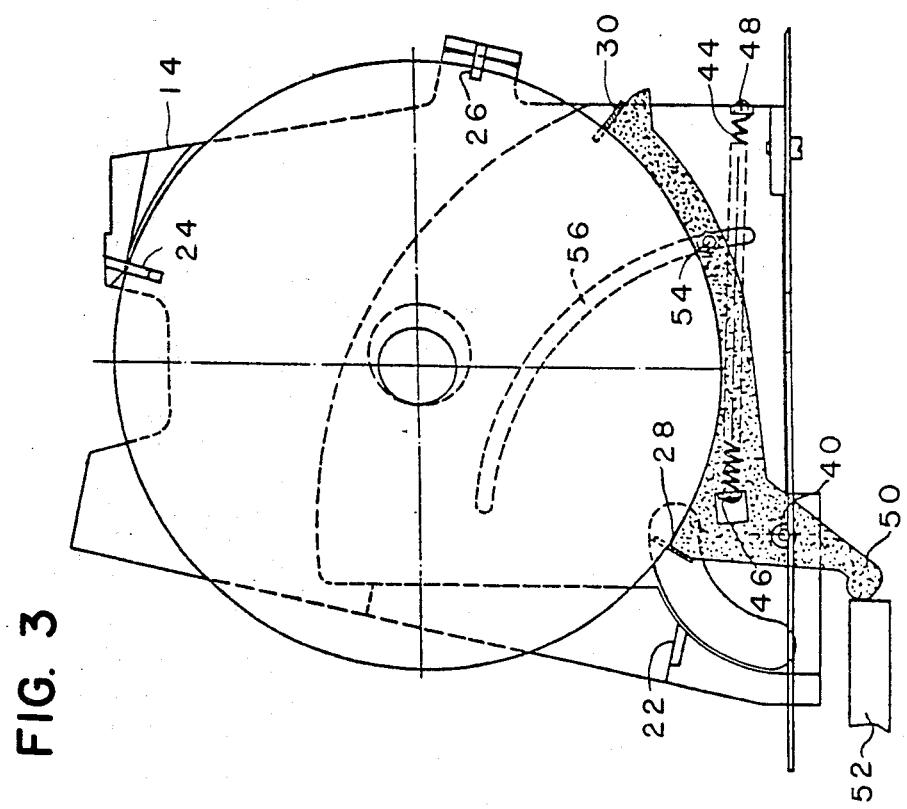
FIG. 3 is a view similar to FIG. 1, as indicated by the line 3—3 of FIG. 2, with the pivotally mounted securing lever and the record disc in an intermediate position within the compartment.

To raise the securing lever 38 to the position shown in FIG. 1, the lever 38 has an arm 50 which is engageable by a movable actuator 52 to rotate the lever 38 counterclockwise about the axis of the supporting shaft 40 from the positions of FIGS. 3 and 4 to the position of FIG. 1 against the tension of the spring 44. A record disc 12, after being inserted into the compartment entrance 18 and into engagement with the fourth V-grooved member 30 carried by the securing lever 38, is guided into the compartment 10 and into engagement with the first and third V-grooved members 24, 28 by rotating the securing lever 38 clockwise to the intermediate position shown in FIG. 3. In this intermediate position, the disc 12 is in the compartment 10 but displaced a small distance from the final fixed position of FIG. 4. Upon rotation of the securing lever 38 clockwise the short angular distance A, as shown in FIG. 4, the disc 12 moves fully into the notch 36 of the second V-grooved member 26 at the back of the compartment 10, and the third V-grooved member 28 passes, in effect, "over center" and reaches a latch position holding the disc 12 in its fixed position against the first and second members 24, 26. In this last stage of movement, the fourth member 30 is disengaged from the disc 12 by the rotation of the lever 38.

To release the record disc 12, the actuator 52 is moved against the arm 50 of the securing lever 38 to rotate the lever 38 counterclockwise to the FIG. 3 position. The actuator 52 can continue to move the arm 50 and rotate the securing lever 38 counterclockwise to the raised position of FIG. 1 to eject the record disc 12 through the entrance and from the compartment 10. In this movement, the lever 38 is guided by a pin 54 moving along an arcuate slot 56 in the wall 14.

Figure 5:
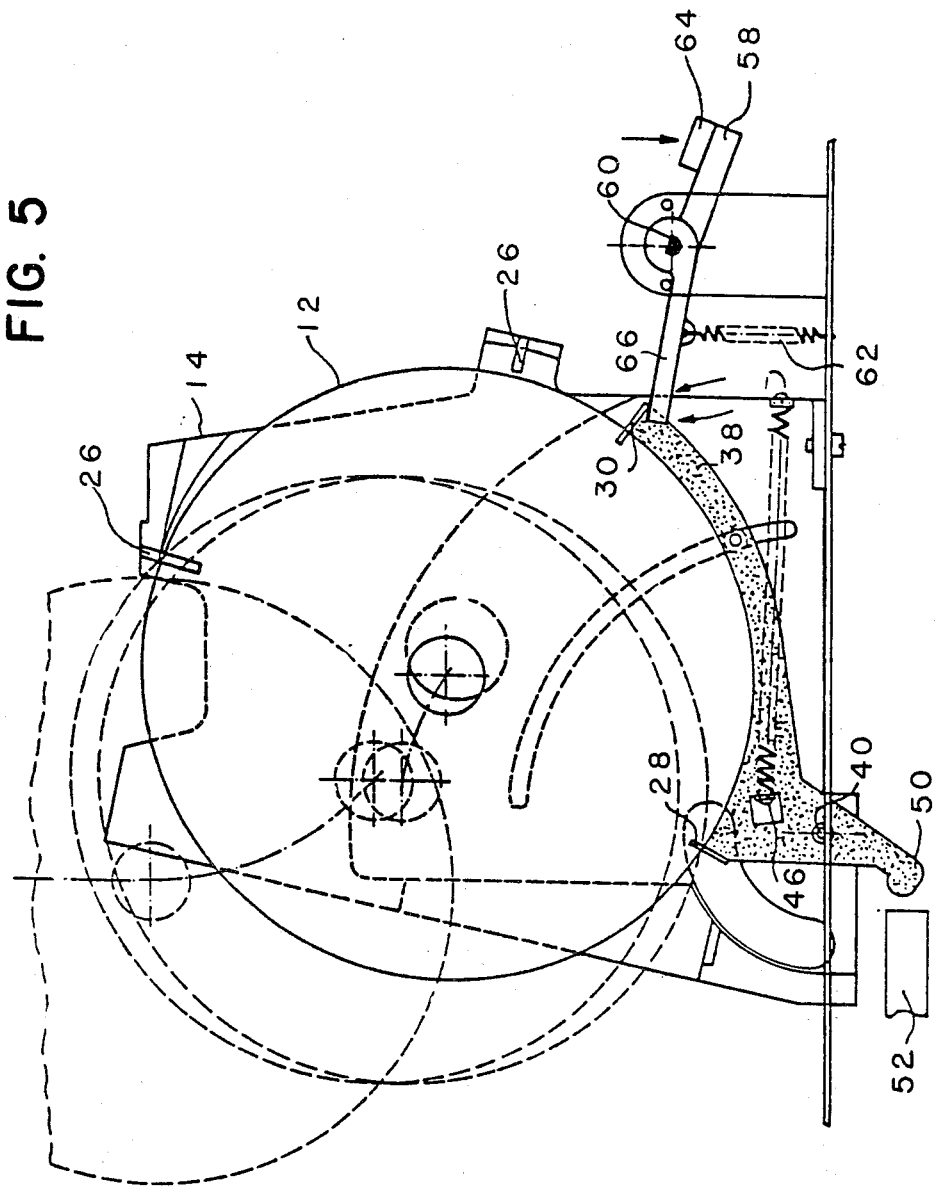
FIG. 5 is a view similar to FIGS. 1, 3 and 4 with the addition of a single control mechanism for common release of the securing levers of a multicompartmented storage device.

Referring to FIG. 5, another mechanism is shown to release a disc 12 from a single compartment 10 or for simultaneously releasing a plurality of discs from multiple compartment of a rack or magazine so that they may be removed manually, for example. In this case, a release lever 58 is mounted on a shaft 60 and is normally rotated counterclockwise by a spring 62 so as to be clear of contact with the securing lever 38. One end of the release lever 58 has a pad 64 which is engageable manually or by an actuator to raise the other end of the release lever, which is in the form of a finger 66 that engages the lug member 30 of the securing lever 38 and exerts a generally upward force against the securing lever 38 and the record disc 12. In this way, the securing lever 38 and the record disc 12 in each compartment 10 are shifted from the fixed position of the disc in FIG. 4 to the released position of the disc in FIG. 3 in which the disc can be withdrawn manually or by a mechanism from, or introduced into, the rack or magazine compartment 10, as indicated generally in FIG. 5.

Turning now to FIG. 6, as herein shown the compartments 10, 10' may be juxtaposed in an arcuate arrangement, extending radially from an arc displaced from the center of a circle. Such an arrangement is preferred for a magazine arranged about a centrally located playing or recording mechanism, as shown, for example, in Belgian Pat. No. 898.775.

Figure 9:
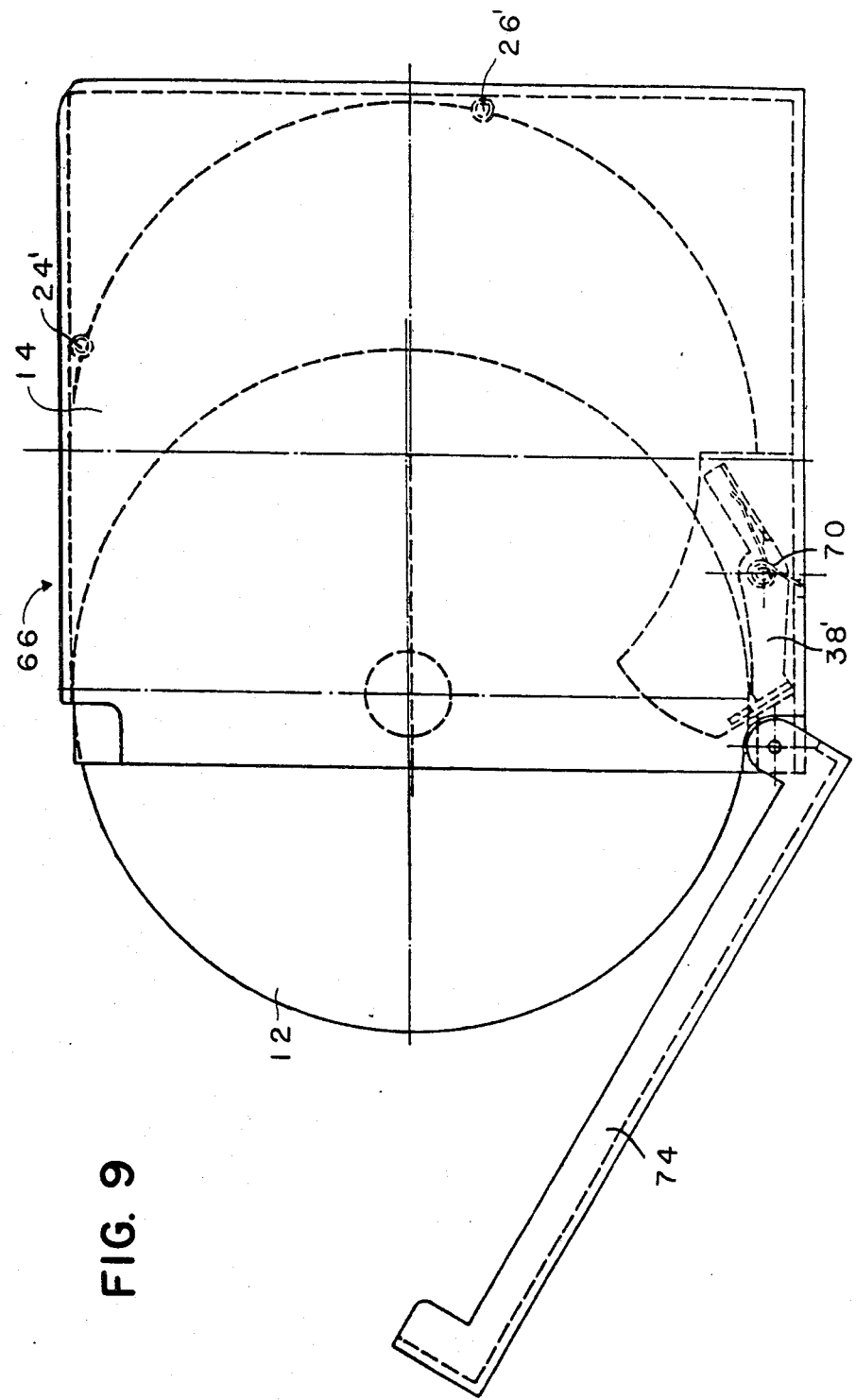
FIG. 9 is a side view of the storage device of FIGS. 7 and 8 with a record disc shown partially inserted and the front cover of the device open.

Another embodiment of the invention is shown in FIGS. 7-9, which illustrate a housing or container 66 for a record disc 12 having a single compartment 10". It is preferred that the inside surfaces 34' of the walls 14', 16' of the container 66 have a concave shape to avoid contact with the surfaces of a record disc 12 as it is inserted into or withdrawn from the compartment.

According to the invention, a record disc 12 is held in fixed position, shown in FIG. 7, in the compartment 10" by a pair of V-grooved members 24', 26', herein shown as V-grooved, pulley-like discs, each mounted for rotation about their own axes and adapted to engage the record disc 12 solely at the edge. A first V-grooved disc 24' is mounted generally adjacent and behind the transverse center line TL of the compartment. The second V-grooved disc 26' is mounted to engage the record disc 12 at an edge portion spaced peripherally approximately 90 degrees from the first member 24'.

In this embodiment of the invention, a third movably mounted V-grooved member 28' is provided in the form of a lug on a lever 38' pivotally mounted within the container, and the V-groove 36' in the lug is adapted to engage the record disc 12 at an edge portion adjacent the entrance to the compartment 10" and spaced peripherally more than 90 degrees from the second fixed V-grooved disc 26'. The lever 38' is biased clockwise by a spring 68 which has one end bearing against the inside of the container 66, the center 70 wrapped around the axis of a shaft supporting the securing lever 38', and the other end bearing against a projection 72 on the securing lever 38'. The third member 28' is located far enough forward of the transverse center line TL (similarly to the mounting of the securing lever 38' of FIGS. 1-5) so that the securing lever bears against the record disc 12 edge to push the disc against the other two fixed members 24', 26' and latch the disc in that position, holding it securely and immobile. On the other hand, since the disc 12 is held resiliently by the spring 68 in its fixed position within the compartment 10″, as shown in FIG. 7, the disc 12 may be released by exerting a downward force on the edge of the disc 12 so as to rotate the securing lever 38′ counterclockwise a short distance to release it from the latching position in which case, as shown in FIG. 9, the disc may be withdrawn through the entrance from the compartment 10″. It is important to provide the entrance with concave edges 34′ so that the disc 12 engages the walls of the compartment solely at the edges of the disc and is prevented from contacting the walls of the compartment along the surfaces of the disc.

It will be observed that the securing lever 38′ in the embodiment shown in FIGS. 7-9 has only a single V-grooved member 28′ engaging the disc 12 instead of the pair of members shown in the embodiment of FIGS. 1-5.

As shown in FIG. 9, the container 66 preferably has a hinged cover 74 to close and open the entrance of the container 66.

If desired, a link (not shown) can be provided between the cover 74 and the securing lever 38′ to rotate the securing lever counterclockwise and clockwise upon movement of the cover in the closing or opening direction to facilitate insertion and removal of the disc.

We claim:

1. A storage device for record discs comprising:
    a housing defining a compartment for receiving a record disc in a fixed position, said compartment having an entrance through which the disc is inserted edgewise inwardly in a longitudinal directon in its own plane to the fixed position, said compartment having longitudinal and transverse center lines intersecting at the center of the disc when in the fixed position;
    a first fixed engaging member fixed in the compartment at a position behind the transverse center line above the longitudinal center line and providing a notch to tangentially engage the edge of the disc when the disc is in the fixed position to hold the disc against longitudinal inward and lateral movement;
    a second fixed engaging member fixed in the compartment at a position behind the transverse center line below the longitudinal center line in a back portion of the compartment and providing a notch to tangentially engage the back edge of the disc when the disc in in the fixed position to hold the disc against longitudinal inward and lateral movement;
    a pivotally-mounted securing lever and a third engaging member carried by said lever to be movably mounted in the compartment for longitudinal movement in the plane of the disc, said third movable engaging member providing a notch to tangentially engage the front edge of the disc at a position adjacent and forward of the transverse center line below the longitudinal center line; and
    locking means including a resilient member acting on said securing lever to urge said third movable member in the longitudinal direction to hold the disc against lateral movement and against said first and second members when the disc is in the fixed position, said securing lever being pivotally mounted for movement from a position in which said third movable member resiliently urges a disc against said first and second fixed members to hold the disc at three peripherally spaced tangential locations and immobile in the fixed position in the compartment, said securing lever being pivotally movable to a release position in which the disc is released to be withdrawn from the compartment.

2. A storage device according to claim 1, said first and second fixed members engaging the edge of a record disc when in the fixed position at portions peripherally spaced about 90 degrees apart, said third movable member being located to engage the edge of the record disc at a portion peripherally spaced greater than 90 degrees from one of said first and second members.

3. A storage device for record discs comprising:
    a housing defining a compartment for receiving a record disc in a fixed position, said compartment having an entrance through which the disc is inserted edgewise inwardly in a longitudinal direction in its own plane to the fixed position, said compartment having longitudinal and transverse center lines intersecting at the center of the disc when in the fixed position;
    a first fixed engaging member fixed in the compartment at a position behind the transverse center line above the longitudinal center line and providing a notch to tangentially engage the edge of the disc when the disc is in the fixed position to hold the disc against longitudinal inward and lateral movement;
    a second fixed engaging member fixed in the compartment at a position behind the transverse center line below the longitudinal center line in a back portion of the compartment and providing a notch to tangentially engage the back edge of the disc when the disc in in the fixed position to hold the disc against longitudinal inward and lateral movement;
    a pivotally-mounted securing lever and a third engaging member carried by said lever to be movably mounted in the compartment for longitudinal movement in the plane of the disc, said third movable engaging member providing a notch to tangentially engage the front edge of the disc at a position adjacent and forward of the transverse center line below the longitudinal center line;
    locking means including a resilient member acting on said securing lever to urge said third movable member in the longitudinal direction to hold the disc against lateral movement and against said first and second members when the disc is in the fixed position, said securing lever being pivotally mounted for movement from a position in which said third movable member resiliently urges a disc against said first and second fixed members to hold the disc at three peripherally spaced tangential locations and immobile in the fixed position in the compartment, said securing lever being pivotally movable to a release position in which the disc is released to be withdrawn from the compartment; and
    a fourth engaging member carried by said securing lever providing a notch for tangentially engaging the disc;
    said securing lever being pivotable from a position in which said fourth engaging member is spaced from engagment with the record disc when the disc is in the fixed position, to an entrance position in which said fourth engaging member is adjacent the entrance to said compartment in position to be engaged by a record disc as it enters the compartment through the entrance, entering edge-first in its own plane.

* * * * *